(12) United States Patent
Shinkawa et al.

(10) Patent No.: US 7,656,069 B2
(45) Date of Patent: Feb. 2, 2010

(54) DYNAMOELECTRIC MACHINE

(75) Inventors: Kanji Shinkawa, Tokyo (JP); Masaya Inoue, Tokyo (JP); Hiroyuki Akita, Tokyo (JP); Norihiro Murata, Tokyo (JP); Toshiyuki Yoshizawa, Tokyo (JP); Shinji Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 15 days.

(21) Appl. No.: 12/165,934

(22) Filed: Jul. 1, 2008

(65) Prior Publication Data

US 2009/0009021 A1 Jan. 8, 2009

(30) Foreign Application Priority Data

Jul. 3, 2007 (JP) .............................. 2007-174787

(51) Int. Cl.
*H02K 1/22* (2006.01)
(52) U.S. Cl. ........................................ 310/263; 310/52
(58) Field of Classification Search ................. 310/263, 310/52, 156.01–156.84
See application file for complete search history.

(56) References Cited

U.S. PATENT DOCUMENTS 5,483,116 A * 1/1996 Kusase et al. ............... 310/263
6,002,194 A * 12/1999 Asao .......................... 310/263
6,157,111 A * 12/2000 Asao .......................... 310/263
6,853,112 B2 * 2/2005 Nakamura et al. .......... 310/263

FOREIGN PATENT DOCUMENTS

| JP | 10-136623 | 5/1998 |
| JP | 2002-527015 | 8/2002 |
| WO | WO 99/08365 A1 | 2/1999 |

OTHER PUBLICATIONS

U.S. Appl. No. 12/376,969, filed Feb. 10, 2009, Inoue et al.
U.S. Appl. No. 12/444,975, filed Apr. 9, 2009, Inoue, et al.
U.S. Appl. No. 12/141,370, filed Jun. 18, 2008, Inoue et al.
U.S. Appl. No. 12/189,387, filed Aug. 11, 2008, Morita, et al.

* cited by examiner

*Primary Examiner*—Nguyen N Hanh
(74) *Attorney, Agent, or Firm*—Oblon, Spivak, McClelland, Maier & Neustadt, L.L.P.

(57) ABSTRACT

First and second magnet holding apertures are disposed through first and second permanent magnet holding seats that are disposed so as to protrude from first and second yoke portions so as to have aperture centers that are oriented in an axial direction. Cylindrical resin first and second magnet loading portions are disposed so as to project integrally on first and second fans such that central axes thereof are oriented in the axial direction, and first and second permanent magnets are insert-molded into the first and second magnet loading portions. The first and second fans are fixed to first and second pole cores by fitting the first and second magnet loading portions together with the first and second magnet holding apertures.

18 Claims, 3 Drawing Sheets

DYNAMOELECTRIC MACHINE

BACKGROUND OF THE INVENTION

1. Field of the Invention

The present invention relates to a dynamoelectric machine such as an automotive alternator, etc., and particularly relates to a Lundell rotor construction to which permanent magnets are mounted.

2. Description of the Related Art

Automotive alternators that use Lundell rotors have been used in automobiles for decades. Loads from electrical equipment that has been mounted due to environmental issues have increased rapidly in recent years, and further increases in generated power have been sought from Lundell rotors.

Conventionally, means of disposing permanent magnets between claw-shaped magnetic poles that face each other circumferentially in a Lundell rotor have been adopted in order to solve such problems (see Patent Literature 1 and 2, for example).

A means has also been adopted of holding permanent magnets inside pockets that are formed integrally on fans, mounting a fan onto a first pole piece by press-fitting the pockets between an upper surface of a body of the first pole piece and lower surfaces of pole fingers of a second pole piece, and mounting a fan to the second pole piece by press-fitting the pockets between an upper surface of a body of the second pole piece and lower surfaces of pole fingers of the first pole piece (see Patent Literature 3, for example).

Patent Literature 1: Japanese Patent Laid-Open No. SHO 61-85045 (Gazette)

Patent Literature 2: U.S. Pat. No. 4,959,577 (Specification)

Patent Literature 3: Japanese Patent Publication No. 2002-527015 (Gazette)

In Patent Literature 1 and 2, when holding the permanent magnets between the claw-shaped magnetic pole portions, it is necessary to position the permanent magnets relative to the facing claw-shaped magnetic pole portions with high precision, making it necessary to add a magnet holding member, or to form magnet holding grooves on the claw-shaped magnetic pole portions by machining, leading to steep rises in production costs and reductions in mass producibility.

In the technique according to Patent Literature 3, the pockets that hold the permanent magnets are formed so as to have an approximately rectangular cross-sectional shape that conforms to an interfitting space between the body of one pole piece and the pole fingers of the other pole piece. In order to strengthen the hold on the pockets that hold the permanent magnets, it is necessary to machine the interfitting surfaces of the pole pieces with high precision. However, the surfaces of the pole pieces that fit together with the pockets are flat surfaces or gently curved surfaces, and after-processing of the pole pieces by high-performance machine tools is required, requiring huge machining costs and machining time. Because displacement of tip ends of the claw-shaped magnetic pole portions in excess of 100 μm radially outward also arises during high-speed rotation, stable holding of the permanent magnets cannot be achieved in a construction in which centrifugal forces that act on the pockets that hold the permanent magnets are held by tip end inner circumferential surfaces of the claw-shaped magnetic pole portions. Because the permanent magnets are insert-molded into the fans, the permanent magnets may be displaced radially outward together with the displacement of the tip ends of the claw-shaped magnetic pole portions during high-speed rotation, and there has been a risk that excessive stresses may act on the fans and damage the fans.

SUMMARY OF THE INVENTION

The present invention aims to solve the above problems and an object of the present invention is to provide a dynamoelectric machine that can increase magnet holding reliability without magnet holding being affected directly by displacement at tip end portions of claw-shaped magnetic pole portions that results from centrifugal forces, or by relative displacement between adjacent claw-shaped magnetic pole portions, and that can also simplify magnet holding construction, increase magnet mountability, reduce production costs, and increase mass producibility.

In order to achieve the above object, according to one aspect of the present invention, there is provided a dynamoelectric machine including: a rotor having: a pole core having: a boss portion; a pair of yoke portions that are disposed so as to extend radially outward from two axial end edge portions of the boss portion; and a plurality of claw-shaped magnetic pole portions that are disposed so as to extend axially alternately from each of the pair of yoke portions, and that are arranged circumferentially so as to intermesh with each other, the pole core being fixed to a shaft that is inserted through a central axial position of the boss portion; a field coil that is housed inside a space that is surrounded by the boss portion, the pair of yoke portions, and the plurality of claw-shaped magnetic pole portions; and a pair of fans that are fixed to two axial end surfaces of the pole core. In addition, the dynamoelectric machine includes: a permanent magnet holding portion that is disposed integrally so as to project from the yoke portion, the permanent magnet holding portion facing an inner circumferential surface near a tip end of the claw-shaped magnetic pole portion; a cylindrical magnet holding aperture that is disposed through the permanent magnet holding portion so as to have an aperture center that is oriented in an axial direction, and that have an axial opening that faces the inner circumferential surface near the tip end of the claw-shaped magnetic pole portion; a resin magnet loading portion that is formed so as to have a cylindrical body that can fit together with the magnet holding aperture, and that is disposed so as to project integrally on the fan such that a central axis of the cylindrical body is oriented in an axial direction so as to correspond to the magnet holding aperture; and permanent magnet that is insert-molded into the magnet loading portion. The fan is fixed to the pole core by fitting the magnet loading portion together with the magnet holding aperture.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Embodiment 1

Figure 1:
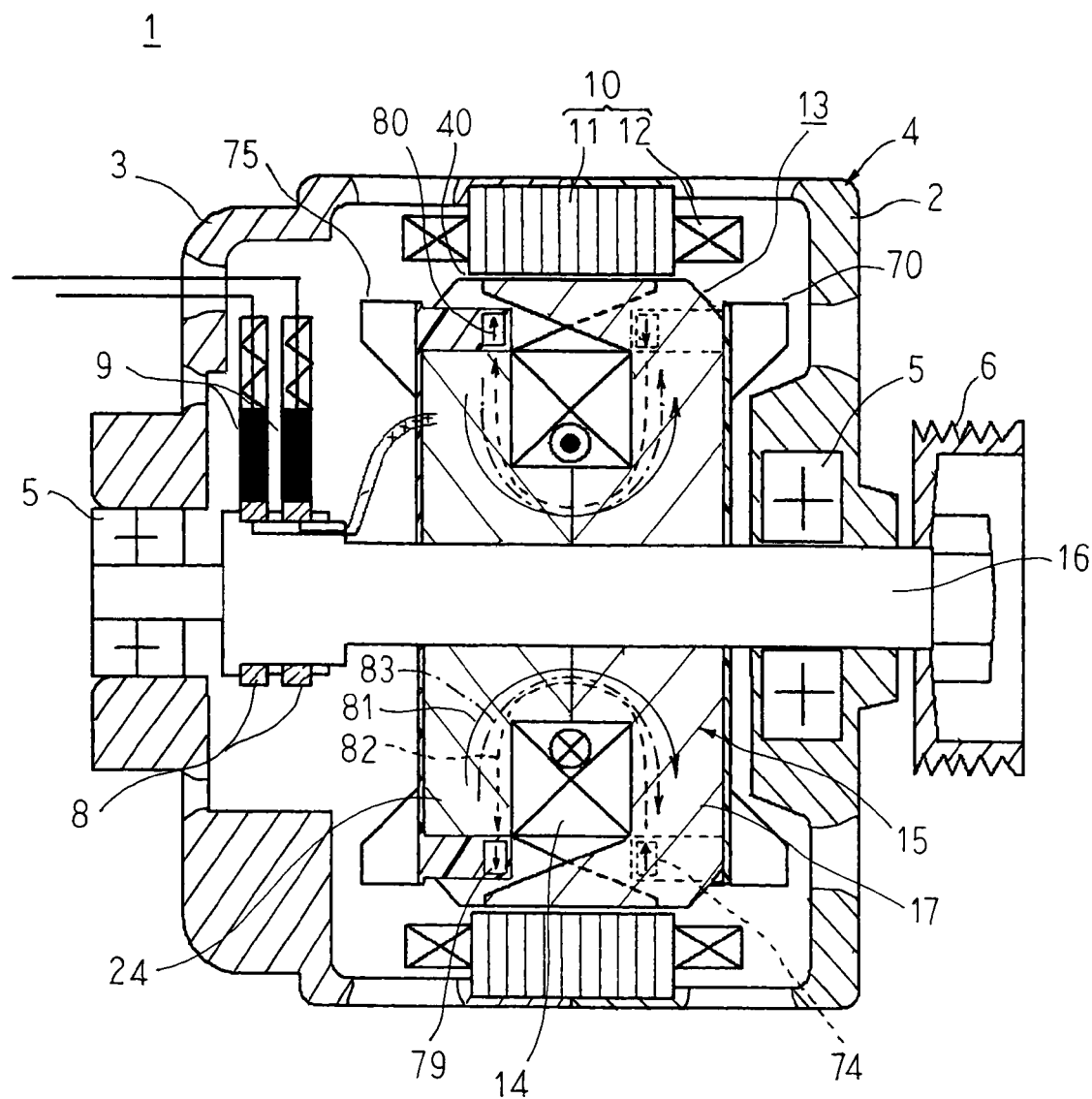
FIG. 1 is a cross section that schematically shows an automotive alternator according to Embodiment 1 of the present invention.
Figure 2:
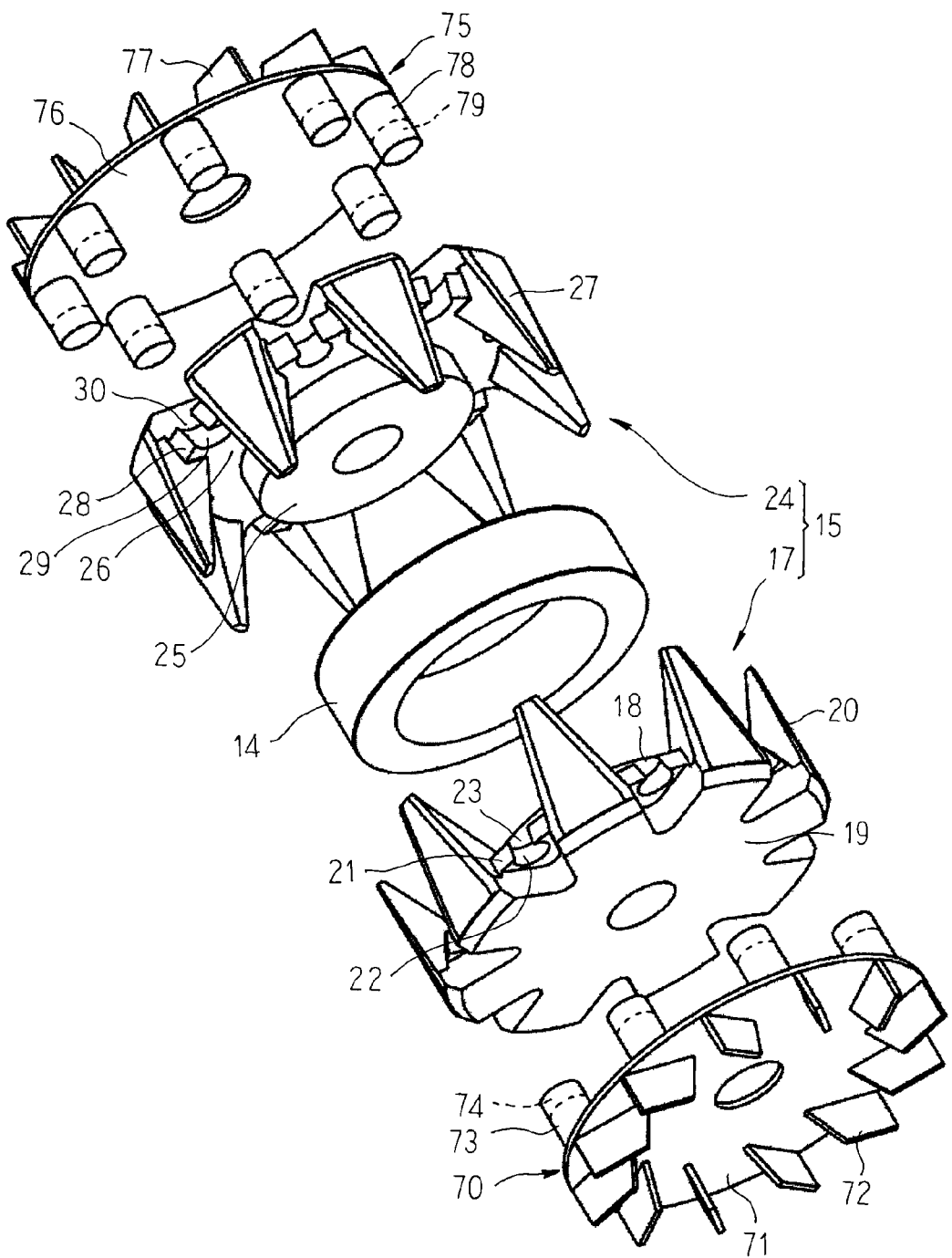
FIG. 2 is an exploded perspective of a rotor that can be used in the automotive alternator according to Embodiment 1 of the present invention.

FIG. 1 is a cross section that schematically shows an automotive alternator according to Embodiment 1 of the present invention, and FIG. 2 is an exploded perspective of a rotor that can be used in the automotive alternator according to Embodiment 1 of the present invention.

In FIG. 1, an automotive alternator 1 includes: a case 4 that is constituted by a front bracket 2 and a rear bracket 3 that are each made of aluminum so as to have an approximate cup shape; a rotor 13 that is rotatably disposed inside the case 4 such that a shaft 16 is supported by means of bearings 5 in the case 4; a pulley 6 that is fixed to an end portion of the shaft 16 that projects outward at a front end of the case 4; a stator 10 that is fixed to the case 4 so as to surround an outer circumference of the rotor 13 so as to have a constant air gap 40 relative to the rotor 13; a pair of slip rings 8 that are fixed to a rear end of the shaft 16, and that supply current to the rotor 13; and a pair of brushes 9 that are disposed inside the case 4 so as to slide on the respective slip rings 8. Moreover, although not shown, a rectifier that rectifies an alternating current that is generated in the stator 10 into direct current, and a voltage regulator that adjusts magnitude of an alternating voltage generated in the stator 10, etc., are disposed inside the case 4.

The stator 10 includes: a cylindrical stator core 11; and a stator coil 12 that is installed in the stator core 11, and in which an alternating current arises due to changes in magnetic flux from a field coil 14 that accompany rotation of the rotor 13.

The rotor 13 includes: a field coil 14 that generates magnetic flux on passage of an excitation current; a pole core 15 that is disposed so as to cover the field coil 14 and in which magnetic poles are formed by that magnetic flux; first and second resin fans 70 and 75 that are fixed to two axial end surfaces of the pole core 15; and the shaft 16, which is fitted through a central axial position of the pole core 15. First and second permanent magnets 74 and 79 are mounted internally into the first and second fans 70 and 75 by insert-molding, and are magnetized so as to constitute components that are in a radial direction of the rotor 13 and reverse in direction to a magnetic field 81 that the field coil 14 produces.

Next, a configuration of the rotor 13 will be explained with reference to FIG. 2.

The first fan 70 has: a disk-shaped first base portion 71 that has a shaft insertion aperture at a central portion; a plurality of first blades 72 that are disposed so as to protrude from a first surface of the first base portion 71; and eight, for example, cylindrical first magnet loading portions 73 that are arranged at a uniform angular pitch concyclically on a second surface of the first base portion 71. The first base portion 71, the first blades 72, and the first magnet loading portions 73 are prepared integrally by injection-molding a resin such as an epoxy, nylon 66, etc., for example. At this point, cylindrical first permanent magnets 74 are mounted internally into each of the first magnet loading portions 73 so as to be insert-molded coaxially.

The second fan 75 has: a disk-shaped second base portion 76 that has a shaft insertion aperture at a central portion; a plurality of second blades 77 that are disposed so as to protrude from a first surface of the second base portion 76; and eight, for example, cylindrical second magnet loading portions 78 that are arranged at a uniform angular pitch concyclically on a second surface of the second base portion 76. The second base portion 76, the second blades 77, and the second magnet loading portions 78 are prepared integrally by injection-molding a resin such as an epoxy, nylon 66, etc., for example. At this point, cylindrical second permanent magnets 79 are mounted internally into each of the second magnet loading portions 78 so as to be insert-molded coaxially.

The pole core 15 is constructed so as to be divided into first and second pole core bodies 17 and 24 that are each prepared by a cold forging manufacturing method using a low carbon steel such as S10C, for example.

The first pole core body 17 has: a first boss portion 18 that has an outer circumferential surface that has a cylindrical shape, and through which a shaft insertion aperture is disposed at a central axial position; a thick ring-shaped first yoke portion 19 that is disposed so as to extend radially outward from a first axial end edge portion of the first boss portion 18; first claw-shaped magnetic pole portions 20 that are disposed so as to extend toward a second axial end from outer circumferential portions of the first yoke portion 19; and first magnet holding seats 21 that function as a permanent magnet holding portion. Eight, for example, first claw-shaped magnetic pole portions 20 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially. The first magnet holding seats 21 are disposed so as to project integrally on portions of the first yoke portion 19 between adjacent first claw-shaped magnetic pole portions 20. First magnet holding apertures 22 form cylindrical shapes that have an inside diameter that is identical to an outside diameter of the first magnet loading portions 73, and are disposed through the first magnet holding seats 21 so as to have an aperture center that is oriented in an axial direction. First axial openings 23 that open the first magnet holding apertures 22 radially outward from the rotor 13 are formed so as to extend from a first axial end to a second axial end on outer circumferential portions of the first magnet holding seats 21.

The second pole core body 24 has: a second boss portion 25 that has an outer circumferential surface that has a cylindrical shape, and through which a shaft insertion aperture is disposed at a central axial position; a thick ring-shaped second yoke portion 26 that is disposed so as to extend radially outward from a second axial end edge portion of the second boss portion 25; second claw-shaped magnetic pole portions 27 that are disposed so as to extend toward a first axial end from outer circumferential portions of the second yoke portion 26; and second magnet holding seats 28 that function as a permanent magnet holding portion. Eight second claw-shaped magnetic pole portions 27, for example, are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 26 at a uniform angular pitch circumferentially. The second magnet holding seats 28 are disposed so as to project integrally on portions of the second yoke portion 26 between adjacent second claw-shaped magnetic pole portions 27. Second magnet holding apertures 29 form cylindrical shapes that have an inside diameter that is identical to an outside diameter of the second magnet loading portions 78, and are disposed through the second magnet holding seats 28 so as to have an aperture center that is oriented in an axial direction. Second axial openings 30 that open the second magnet holding apertures 29 radially outward from the rotor 13 are formed so as to extend from a second axial end to a first axial end on outer circumferential portions of the second magnet holding seats 28.

The first and second pole core bodies 17 and 24 that are configured in this manner are fixed to the shaft 16 that has been fitted through the shaft insertion apertures such that the first and second claw-shaped magnetic pole portions 20 and 27 alternately intermesh and a second end surface of the first boss portion 18 is abutted to a first end surface of the second boss portion 25. The field coil 14, which has been wound onto a bobbin (not shown), is mounted in a space that is surrounded by the first and second boss portions 18 and 25, the first and second yoke portions 19 and 26, and the first and second claw-shaped magnetic pole portions 20 and 27. Here, the first and second boss portions 18 and 25 and the first and second yoke portions 19 and 26 correspond to a boss portion and first and second yoke portions of the pole core 15. The first and second axial openings 23 and 30 face tip end inner circumferential surfaces of the second and first claw-shaped magnetic pole portions 27 and 20.

The first fan 70 is fixed to the first pole core body 17 by inserting each of the first magnet loading portions 73 into the respective first magnet holding apertures 22 from the first axial end. Here, portions of the first magnet loading portions 73 that project from the first axial openings 23 face the inner circumferential surfaces near the tip ends of the second claw-shaped magnetic pole portion 27. The second fan 75 is fixed to the second pole core body 24 by inserting each of the second magnet loading portions 78 into the respective second magnet holding apertures 29 from the second axial end. Here, portions of the second magnet loading portions 78 that project from the second axial openings 30 face the inner circumferential surfaces near the tip ends of the first claw-shaped magnetic pole portion 20.

The first and second permanent magnets 74 and 79 are magnetically oriented so as to have directions of magnetization 80 that are opposite to the orientation of a magnetic field 81 that the field current that flows through the field coil 14 produces in a plane that is perpendicular to a central axis of the rotor 13. In other words, if the magnetic field 81 is generated in the direction of the arrow as shown in FIG. 1 when an electric current is passed through the field coil 14, the first and second permanent magnets 74 and 79 are magnetically oriented in a reverse direction to the magnetic field 81. In this case, the directions of magnetization 80 of the first and second permanent magnets 74 and 79 are oriented radially, and extensions of the directions of magnetization 80 are directed at inner circumferential surfaces near the tip ends of the facing first and second claw-shaped magnetic pole portions 20 and 27. Moreover, in the case of a design in which the orientation of the magnetic field 81 that the field current that flows through the field coil 14 produces is inverted, the first and second permanent magnets 74 and 79 will also be magnetically oriented in a reverse direction.

Next, operation of an automotive alternator 1 that is configured in this manner will be explained.

First, current is supplied from a battery (not shown) to the field coil 14 of the rotor 13 by means of the brushes 9 and the slip rings 8, generating magnetic flux. The first claw-shaped magnetic pole portions 20 of the first pole core body 17 are magnetized into North-seeking (N) poles by this magnetic flux, and the second claw-shaped magnetic pole portion 27 of the second pole core body 24 are magnetized into South-seeking (S) poles.

At the same time, rotational torque from an engine is transmitted to the shaft 16 by means of a belt (not shown) and the pulley 6, rotating the rotor 13. Thus, a rotating magnetic field is applied to the stator coil 12 of the stator 10, generating electromotive forces in the stator coil 12. These alternating-current electromotive forces are rectified into direct current by the rectifier to charge the battery or to be supplied to electric loads, etc.

Next, operation of the magnetic flux will be explained with reference to FIGS. 1 and 2.

First, magnetic flux 83 is generated when an electric current is passed through the field coil 14. This magnetic flux 83 enters tooth portions of the stator core 11 by passing through the air gap 40 from the first claw-shaped magnetic pole portions 20. The magnetic flux 83 then moves circumferentially through a core back portion from the tooth portions of the stator core 11, and enters neighboring second claw-shaped magnetic pole portions 27 by passing through the air gap 40 from the tooth portions that face those second claw-shaped magnetic pole portions 27. Next, the magnetic flux 83 that has entered the second claw-shaped magnetic pole portions 27 passes through the second yoke portion 26, the second boss portion 25, the first boss portion 18, and the first yoke portion 19, and reaches the first claw-shaped magnetic pole portions 20. Now, in a conventional Lundell rotor, because the first and second pole core bodies are at their design limit, they are magnetically saturated by the magnetic field that is generated by the field coil, reducing magnetic flux that is generated by the rotor.

In Embodiment 1, the first and second permanent magnets 74 and 79 are magnetically oriented so as to be opposite to the orientation of the magnetic field 81 that is generated by the field coil 14. Thus, the orientation of the magnetic field that originates from the first and second permanent magnets 74 and 79 is in a reverse direction to the magnetic field 81 that is generated by the field coil 14. To interlink with the stator core 11, it is necessary for the magnetic flux 82 that originates from these first and second permanent magnets 74 and 79 to make a round trip across the air gap 40, which has a large magnetic resistance. The first and second permanent magnets 74 and 79 are disposed radially inside the second and first claw-shaped magnetic pole portions 27 and 20, and are disposed so as to circuit in a shorter magnetic path length than the inner circumferential surface sides of the first and second claw-shaped magnetic pole portions 20 and 27. Thus, a large portion of the magnetic flux 82 forms a closed magnetic circuit inside the rotor without going around through the stator core 11.

In other words, the magnetic flux 82 that originates from the first permanent magnets 74 passes from the first magnet loading portions 73 through the first magnet holding seats 21, the first yoke portion 19, the first boss portion 18, the second boss portion 25, the second yoke portion 26, and the second claw-shaped magnetic pole portions 27, and returns to the first permanent magnets 74. The magnetic flux 82 that originates from the second permanent magnets 79 enters the first claw-shaped magnetic pole portions 20 by means of the air gap, passes through the first yoke portion 19, the first boss portion 18, the second boss portion 25, the second yoke portion 26, the second magnet holding seats 28, and the second magnet loading portions 78, and returns to the second permanent magnets 79.

Thus, the magnetic flux 82 that originates from the first and second permanent magnets 74 and 79 is in a reverse direction from the magnetic flux 83 that originates from the field coil 14, enabling the magnetic flux density of the magnetic bodies that constitute the first and second pole core bodies 17 and 24 to be reduced significantly, thereby enabling magnetic saturation to be relieved. Because the magnetic flux 82 that originates from the first and second permanent magnets 74 and 79 forms a closed magnetic circuit inside the rotor, the occurrence of induced voltages during no-load de-energization is suppressed.

According to Embodiment 1, eight first and second permanent magnets 74 and 79 each, for example, are molded integrally by being insert-molded during injection-molding of the first and second fans 70 and 75, the number of parts is reduced significantly, and mounting of the first and second permanent magnets 74 and 79 is also completed simultaneously with installation of the first and second fans 70 and 75, improving assembly.

The first and second permanent magnets 74 and 79 are mounted onto the pole core 15 by inserting the cylindrical first and second magnet loading portions 73 and 78, into which the first and second permanent magnets 74 and 79 have been insert-molded, into the cylindrical first and second magnet holding apertures 22 and 29 that are formed on the first and second magnet holding seats 21 and 28. Thus, because the first and second permanent magnets 74 and 79 are positioned radially inside the first and second claw-shaped magnetic pole portions 20 and 27, centrifugal forces that act on the first and second permanent magnets 74 and 79 are reduced, enabling the holding construction for the first and second permanent magnets 74 and 79 to be simplified. Because the first and second permanent magnets 74 and 79 are not affected by the first and second claw-shaped magnetic pole portions 20 and 27, which are displaced greatly relative to centrifugal forces, holding of the first and second permanent magnets 74 and 79 is facilitated. In addition, because the first and second permanent magnets 74 and 79 are not affected by axial displacement between the claw-shaped magnetic pole portions that results from thermal expansion of the rotor, holding of the first and second permanent magnets 74 and 79 is also facilitated if the present invention is applied to automotive alternators that have a wide temperature range. Because of these facts, the holding reliability for the first and second permanent magnets 74 and 79 is improved.

Stated another way, magnet loading portions into which permanent magnets have been insert-molded are held near a yoke portion. Thus, because displacement of the claw-shaped magnetic poles that results from centrifugal forces and thermal expansion will not affect the permanent magnets, the occurrence of cracking or chipping of the permanent magnets that results from the displacement of the claw-shaped magnetic pole portions is suppressed. Because the permanent magnets are positioned radially inside the claw-shaped magnetic pole portions, centrifugal forces that act on the permanent magnets are reduced, facilitating holding of the permanent magnets, and increasing magnet holding reliability.

Because the centrifugal forces that act on the first and second permanent magnets 74 and 79 are borne by the first and second magnet holding seats 21 and 28, excessive stresses do not act on the first and second fans 70 and 75, preventing the occurrence of damage to the first and second fans 70 and 75, and also preventing throwing of the first and second permanent magnets 74 and 79 during high-speed rotation.

Because the first and second magnet holding apertures 22 and 29 have a cylindrical shape that has first and second axial openings 23 and 30, high-precision first and second magnet holding apertures 22 and 29 can be formed using only single axial machining by rotary teeth such as a drill, etc., enabling shortening of machining time and simplification of equipment, reducing production costs, and enabling mass producibility to be increased significantly.

Because the cylindrical first and second permanent magnets 74 and 79 are insert-molded into the cylindrical first and second magnet loading portions 73 and 78, resin thickness around the first and second permanent magnets 74 and 79 is easily made uniform, suppressing the occurrence of resin chipping, and shape accuracy of the first and second magnet loading portions 73 and 78 is also increased, enabling interfitting accuracy between the first and second magnet loading portions 73 and 78 and the first and second magnet holding apertures 22 and 29 to be increased, thereby improving mountability of the permanent magnets.

Because the cylindrical magnet loading portions into which the permanent magnets have been insert-molded are inserted into and held by the cylindrical magnet holding apertures, which have an axial opening on a portion of an inner circumferential wall, the holding construction of the magnet loading portions is simplified, facilitating mountability of the magnet loading portions. Moreover, magnet holding apertures can be prepared easily with high precision using a rotary cutting tool such as a drill or a reamer, etc. If the pole core is loaded with sintered magnets in particular, cutting processes are normally required in order to ensure external shape precision, but according to the present invention, because the external shape precision of the cylindrical magnet loading portions can also be ensured by the metal-molded resin, the magnet external shape need only be approximately as rough as when sinter molded. Consequently, interfitting portions between the pole core and the magnets during loading can be held without wobbling. In addition, because a plurality of magnets that are disposed in a circle are molded integrally with the fan by resin molding, a process for respectively loading the plurality of magnets into the pole core can be integrated with a process for mounting the fan. Because of these facts, reductions in production costs and improvements in mass producibility are made possible.

Conventionally, magnet material has been magnetized after being mounted into the pole core since handling of magnetized permanent magnets is difficult. However, when magnetizing magnet material that has been mounted to the pole core, a considerable magnetizing power source has been required to achieve a sufficiently magnetized state since the pole core blocks magnetic flux against transient magnetic fields during magnetizing due to eddy currents. In the present invention, because the first and second permanent magnets 74 and 79 are molded integrally by being insert-molded during injection-molding of the first and second fans 70 and 75, the first and second permanent magnets 74 and 79 can be handled as part of the first and second fans 70 and 75, improving handling of the first and second permanent magnets 74 and 79. For this reason, because a method for magnetizing the magnet material after unmagnetized magnet material has been insert-molded into the first and second fans 70 and 75 can be adopted, the first and second permanent magnets 74 and 79 can be magnetized to a sufficiently magnetized state without having to use a large magnetizing power source. In addition, transient fluctuating magnetic flux during magnetizing will not interlink with the field coil 14, which has a large number of turns, and give rise to excessive induced voltages at two ends of the field coil 14.

Here, it is preferable to perform the magnetizing immediately after injection-molding the first and second fans 70 and 75 into which the first and second permanent magnets 74 and 79 have been insert-molded. Because rare-earth magnets of neodymium in particular are more easily magnetized at high temperatures, a more complete magnetized state can be obtained if use is made of heat remaining after injection-molding when magnetizing the magnets.

Moreover, in Embodiment 1 above, the first and second magnet holding apertures 22 and 29 are formed so as to have a cylindrical shape that has an inside diameter that is identical to an outside diameter of the first and second magnet loading portions 73 and 78, but the first and second magnet holding apertures 22 and 29 may also be formed so as to have a slightly smaller inside diameter than the outside diameter of the first and second magnet loading portions 73 and 78. In that case, even if there are machining errors, the first and second magnet loading portions 73 and 78 can be held firmly by spring force from the first and second magnet holding seats 21 and 28 by inserting the first and second magnet loading portions 73 and 78 so as to push the first and second magnet holding apertures 22 and 29 open slightly. By pushing the first and second magnet holding apertures 22 and 29 push open slightly, a certain amount of allowance can be made for machining errors at the interfitting portions between the first and second magnet holding apertures 22 and 29 and the first and second magnet loading portions 73 and 78.

In Embodiment 1 above, a form in which a base portion, blades, and magnet loading portions are prepared integrally by injection-molding using a resin is disclosed but as a preferred form, but it is not necessary for the base portion, the blades, and the magnet loading portions all to be formed using a resin, provided that at least the magnet loading portions are formed using a resin.

Embodiment 2

Figure 3:
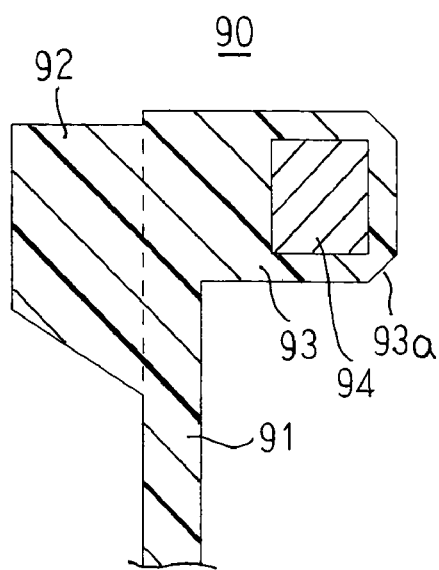
FIG. 3 is a partial cross section that explains a configuration of a fan that can be used in an automotive alternator according to Embodiment 2 of the present invention.

FIG. 3 is a partial cross section that explains a configuration of a fan that can be used in an automotive alternator according to Embodiment 2 of the present invention.

In FIG. 3, a fan 90 is prepared integrally, for example, by injection-molding a resin such as an epoxy, nylon 66, etc., and has: a disk-shaped base portion 91 that has a shaft insertion aperture at a central portion; a plurality of blades 92 that are disposed so as to protrude from a first surface of the base portion 91; and eight, for example, cylindrical magnet loading portions 93 that are arranged at a uniform angular pitch concyclically on a second surface of the base portion 91. A corner portion between a side surface and a leading end surface of a cylindrical body of the magnet loading portions 93 is chamfered so as to form a tapered shape, and cylindrical permanent magnets 94 are mounted internally by being insert-molded coaxially. Moreover, except for the fact that a chamfering portion 93a is formed on the magnet loading portions 93, the fan 90 is configured in a similar manner to the fans 70 and 75 according to Embodiment 1 above.

In a fan 90 that is configured in this manner, the chamfering portion 93a constitutes a guide and enables the magnet loading portions 93 to be inserted into the first and second magnet holding apertures 22 and 29 easily, improving assembly.

Embodiment 3

Figure 4:
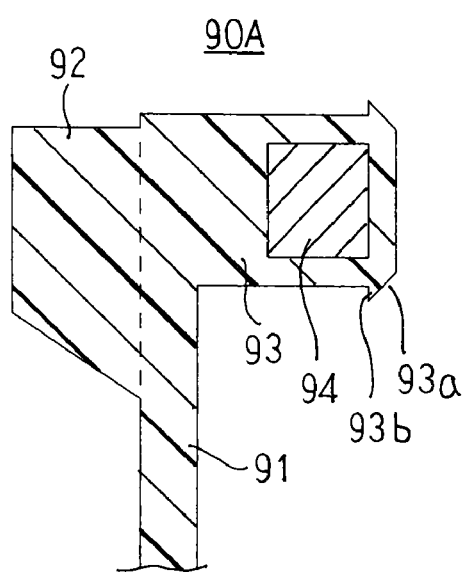
FIG. 4 is a partial cross section that explains a configuration of a fan that can be used in an automotive alternator according to Embodiment 3 of the present invention.

FIG. 4 is a partial cross section that explains a configuration of a fan that can be used in an automotive alternator according to Embodiment 3 of the present invention.

In FIG. 4, a securing lug 93b is disposed so as to project radially outward from a leading end portion of a cylindrical body of a magnet loading portion 93 of a fan 90A, and a chamfering portion 93a is formed on a leading end surface of the securing lug 93b. Moreover, the rest of this embodiment is configured in a similar manner to Embodiment 2 above.

In a fan 90A that is configured in this manner, the chamfering portion 93a constitutes a guide and enables the magnet loading portions 93 to be inserted into the first and second magnet holding apertures 22 and 29 easily, improving assembly. In addition, when the magnet loading portions 93 are inserted into the first and second magnet holding apertures 22 and 29, the securing lugs 93b engage with edge portions of the first and second magnet holding apertures 22 and 29 of the first and second magnet holding seats 21 and 28, preventing the magnet loading portions 93 from being pulled out after assembly.

Embodiment 4

Figure 5:
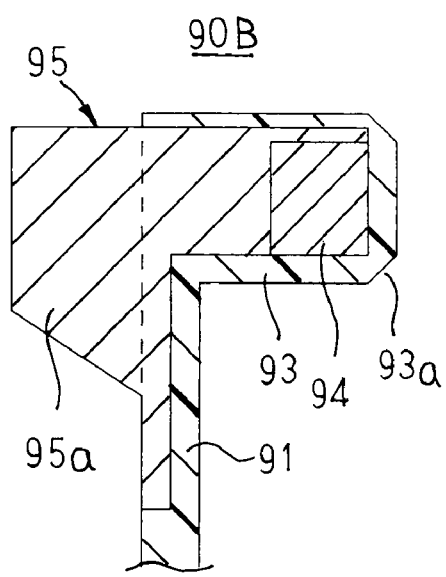
FIG. 5 is a partial cross section that explains a configuration of a fan that can be used in an automotive alternator according to Embodiment 4 of the present invention.

FIG. 5 is a partial cross section that explains a configuration of a fan that can be used in an automotive alternator according to Embodiment 4 of the present invention.

In FIG. 5, a blade member 95 of a fan 90B contacts respective permanent magnets 94, and is insert-molded so as to extend outward from a first surface of a base portion 91. Portions of the blade member 95 that are exposed from the first surface of the base portion 91 constitute blades 95a. A ceramic or a metal material that has a thermal conductivity that is better than that of a resin material of the fan 90B is used in the blade member 95. Moreover, the rest of this embodiment is configured in a similar manner to Embodiment 2 above.

In a fan 90B that is configured in this manner, because heat from the permanent magnets 94 is transferred to the blade member 95 and is radiated from the blades 95a that are exposed from the base portion 91 of the blade member 95, temperature increases in the permanent magnets 94 are suppressed, enabling thermal demagnetization of the permanent magnets 94 to be avoided.

Moreover, in Embodiment 4 above, the blade member 95 is insert-molded in a state of contact with the permanent magnets 94. Here, the state of contact of the blade member 95 with the permanent magnets 94 is not limited to a state of direct contact of the blade member 95 with the permanent magnets 94, and also includes states of contact with the permanent magnets 94 that achieve improved thermal conduction through a thin layer of adhesive or a thin molding, etc., that have arisen due to mass production.

Embodiment 5

Figure 6:
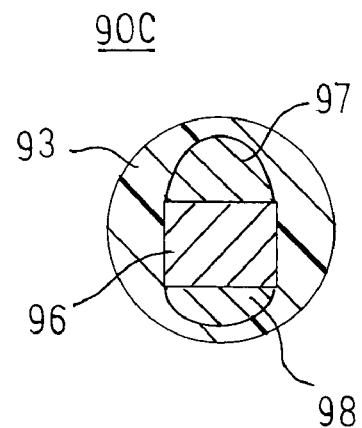
FIG. 6 is a partial cross section that explains a configuration of a fan that can be used in an automotive alternator according to Embodiment 5 of the present invention.

FIG. 6 is a partial cross section that explains a configuration of a fan that can be used in an automotive alternator according to Embodiment 5 of the present invention.

In FIG. 6, a permanent magnet 96 is prepared into a rectangular parallelepiped. A first core member 97 is prepared so as to have a columnar body that has a D-shaped cross section, and a planar side surface thereof is prepared so as to have a shape that conforms to a first surface of the permanent magnet 96. A second core member 98 is prepared so as to have a columnar body that has a D-shaped cross section, and a planar side surface thereof is prepared so as to have a shape that conforms to a second surface of the permanent magnet 96 that is opposite the first surface. The permanent magnet 96 is insert-molded into a magnet loading portion 93 of a fan 90C so as to be held between the first and second core members 97 and 98 from radially outside and inside with the first surface thereof facing radially outward. At this point, the planar side surface of the first core member 97 is placed on the first surface of the permanent magnet 96, which faces radially outward, such that the convexly curved side surface of the first core member 97 faces radially outside, and the planar side surface of the second core member 98 is placed on the second surface of the permanent magnet 96, which faces radially inward, such that the convexly curved side surface of the second core member 98 faces radially inside. Moreover, the rest of this embodiment is configured in a similar manner to Embodiment 2 above.

In a fan 90C that is configured in this manner, because the rectangular parallelepiped permanent magnet 96 is held from radially inside and outside by the first and second core members, which have D-shaped cross sections, it becomes shape that corner portions on the insert members wore roundness further, enabling the thickness of the resin portions that depend on the distance between the insert member and the metal mold to be made more uniform compared with a case to make only the rectangular parallelepiped permanent magnet the insert member, and suppressing the occurrence of resin chipping during injection-molding. Thus, the occurrence of resin chipping can be suppressed and cylindrical magnet loading portions 93 can be prepared even if rectangular parallelepiped permanent magnets 96, which can be prepared inexpensively compared to cylindrical permanent magnets, are used.

Moreover, in Embodiment 5 above, rectangular parallelepiped permanent magnets 96 are used, but the permanent magnets may also be prisms other than rectangular parallelepipeds. In that case, first and second core members should still be insert-molded such that their convexly curved side surfaces face radially inside and outside so as to hold radially outer and inner portions of the permanent magnets from opposite sides.

Moreover, in each of the above embodiments, explanations are given for automotive alternators, but the present invention is not limited to automotive alternators, and similar effects are also exhibited if the present invention is applied to other dynamoelectric machines such as automotive electric motors, automotive generator-motors, etc.

In each of the above embodiments, magnet holding apertures are disposed through all of the magnet holding seats that are formed on portions of the yoke portion between adjacent claw-shaped magnetic pole portions, and permanent magnets are held in all of the magnet holding seats, but it is not necessary to form the magnetic holding seats on all of the portions between adjacent claw-shaped magnetic pole portions, to dispose the magnetic holding apertures through all of the permanent magnetic holding seats, to form the resin magnet loading portions on the fan so as to correspond to all of the magnet holding apertures, or to insert-mold the permanent magnets into all of the resin magnet loading portions. In that case, consideration should be given to magnetic balance and mechanical balance, and permanent magnets may be held in all of the magnet holding seats of the second pole core body, for example, without disposing permanent magnets in the first pole core body, or permanent magnets may be held in every second magnet holding seat circumferentially in both the first and second pole core bodies. By adopting a construction of this kind, adjustment of output by means of the number of permanent magnets becomes possible and also the number of permanent magnets is reduced, enabling costs to be reduced.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dynamoelectric machine comprising:
a rotor comprising:
  a pole core having:
    a boss portion;
    a pair of yoke portions that are disposed so as to extend radially outward from two axial end edge portions of said boss portion; and
    a plurality of claw-shaped magnetic pole portions that are disposed so as to extend axially alternately from each of said pair of yoke portions, and that are arranged circumferentially so as to intermesh with each other,
    said pole core being fixed to a shaft that is inserted through a center axial position of said boss portion;
  a field coil that is housed inside a space that is surrounded by said boss portion, said pair of yoke portions, and said plurality of claw-shaped magnetic pole portions; and
  a pair of fans that are fixed to two axial end surfaces of said pole core,
said dynamoelectric machine further comprising:
a permanent magnet holding portion that is disposed integrally so as to project from said yoke portion, said permanent magnet holding portion facing an inner circumferential surface near a tip end of said claw-shaped magnetic pole portion;
a cylindrical magnet holding aperture that is disposed through said permanent magnet holding portion so as to have an aperture center that is oriented in an axial direction, and that has an axial opening that faces said inner circumferential surface near said tip end of said claw-shaped magnetic pole portion;
a resin magnet loading portion that is formed so as to have a cylindrical body that can fit together with said magnet holding aperture, and that is disposed so as to project integrally on said fan such that a central axis of said cylindrical body is oriented in an axial direction so as to correspond to said magnet holding aperture; and
a permanent magnet that is insert-molded into said magnet loading portion,
wherein said fan is fixed to said pole core by fitting said magnet loading portion together with said magnet holding aperture.

2. A dynamoelectric machine according to Claim 1, wherein said permanent magnet is a cylindrical body.

3. A dynamoelectric machine according to Claim 1, wherein said permanent magnet is a prism, and is insert-molded into said magnet loading portion with radially outer and inner portions thereof held between a columnar first core member that has a side surface that is convexly curved radially outward and a columnar second core member that has a side surface that is convexly curved radially inward.

4. A dynamoelectric machine according to Claim 1, wherein a chamfering portion is formed on a leading end corner portion in a direction of projection of said magnet loading portion.

5. A dynamoelectric machine according to Claim 4, wherein said permanent magnet is a cylindrical body.

6. A dynamoelectric machine according to Claim 4, wherein said permanent magnet is a prism, and is insert-molded into said magnet loading portion with radially outer and inner portions thereof held between a columnar first core member that has a side surface that is convexly curved radially outward and a columnar second core member that has a side surface that is convexly curved radially inward.

7. A dynamoelectric machine according to Claim 4, wherein said fan is molded such that a blade member that has a thermal conductivity better than that of a resin material of said fan contacts said permanent magnet.

8. A dynamoelectric machine according to Claim 7, wherein said permanent magnet is a cylindrical body.

9. A dynamoelectric machine according to Claim 7, wherein said permanent magnet is a prism, and is insert-molded into said magnet loading portion with radially outer and inner portions thereof held between a columnar first core member that has a side surface that is convexly curved radially outward and a columnar second core member that has a side surface that is convexly curved radially inward.

10. A dynamoelectric machine according to Claim 1, wherein a securing lug is disposed so as to project radially outward from a leading end portion in a direction of projection of said magnet loading portion.

11. A dynamoelectric machine according to Claim 10, wherein said permanent magnet is a cylindrical body.

12. A dynamoelectric machine according to Claim 10, wherein said permanent magnet is a prism, and is insert-molded into said magnet loading portion with radially outer and inner portions thereof held between a columnar first core member that has a side surface that is convexly curved radially outward and a columnar second core member that has a side surface that is convexly curved radially inward.

13. A dynamoelectric machine according to Claim 10, wherein said fan is molded such that a blade member that has a thermal conductivity better than that of a resin material of said fan contacts said permanent magnet.

14. A dynamoelectric machine according to Claim 13, wherein said permanent magnet is a cylindrical body.

15. A dynamoelectric machine according to Claim 13, wherein said permanent magnet is a prism, and is insert-molded into said magnet loading portion with radially outer and inner portions thereof held between a columnar first core member that has a side surface that is convexly curved radially outward and a columnar second core member that has a side surface that is convexly curved radially inward.

16. A dynamoelectric machine according to Claim 1, wherein said fan is molded such that a blade member that has a thermal conductivity better than that of a resin material of said fan contacts said permanent magnet.

17. A dynamoelectric machine according to Claim 16, wherein said permanent magnet is a cylindrical body.

18. A dynamoelectric machine according to Claim 16, wherein said permanent magnet is a prism, and is insert-molded into said magnet loading portion with radially outer and inner portions thereof held between a columnar first core member that has a side surface that is convexly curved radially outward and a columnar second core member that has a side surface that is convexly curved radially inward.

* * * * *